(12) United States Patent
Kawakami (10) Patent No.: US 6,533,462 B2
(45) Date of Patent: Mar. 18, 2003

(54) RETAINER FOR ROLLING BEARING AND ROLLING BEARING

(75) Inventor: Kouichi Kawakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/960,742

(22) Filed: Sep. 24, 2001

(65) Prior Publication Data

US 2002/0041719 A1 Apr. 11, 2002

(30) Foreign Application Priority Data

Sep. 22, 2000 (JP) ........................................ 2000-289279

(51) Int. Cl.⁷ ............................................... F16C 33/41
(52) U.S. Cl. ........................................ 384/470; 384/531
(58) Field of Search ................................. 384/470, 531, 384/532, 534, 523

(56) References Cited

U.S. PATENT DOCUMENTS 6,371,655 B1 * 4/2002 Fierling ....................... 384/523

2001/0003547 A1 * 6/2001 Matsuoka ..................... 384/531

* cited by examiner

Primary Examiner—Lenard A. Footland
(74) Attorney, Agent, or Firm—Sughrue Mion, PLLC (57) ABSTRACT

In the circular ring forming the retainer, there is formed a groove for connecting together one end surface of the circular ring (grease placement surface for grease) and a pocket surface. The width of the groove is set such that, on the circumferential direction of the circular ring, it becomes continuously narrower from the far side of the pocket surface toward the near side thereof and, on the depth direction from the placement surface (in the axial direction of the circular ring), it becomes continuously narrower as the depth of the groove increases. In the pawl portion of a pocket, there is formed a cut portion which is continuous with the groove. Along the outer periphery of the circular ring, there is formed a wall portion which projects out from the end surface.

12 Claims, 7 Drawing Sheets

RETAINER FOR ROLLING BEARING AND ROLLING BEARING

BACKGROUND OF THE INVENTION

The present invention relates to a rolling bearing for use in information equipment, acoustic/video equipment and so on, and a retainer for the same. In particular, the present invention relates to a rolling bearing suitable for use in a magnetic disk apparatus (HDD) and an optical disk apparatus, and a retainer for the same.

Conventionally, grease lubrication of a rolling bearing is executed by applying grease to a rolling body or one or more pockets formed in a retainer, or by applying grease into raceway grooves formed in the inner and outer rings of the rolling bearing. In addition, there is also employed a method in which grease is previously placed on one end surface of a circular ring constituting a retainer of a rolling bearing. In this method, when the rolling bearing is rotated, the grease, which is dropped down from the end surface due to the centrifugal force thereof, can be supplied to the raceway grooves of the inner and outer rings.

In the method of applying grease into the raceway grooves, in case where the quantity of grease is excessively large, torque is increased, torque is varied, or an acoustic characteristic is worsened. In case where the quantity of grease is reduced so as to avoid the above problem, lubrication by the grease is insufficient. On the other hand, in case where the method of loading grease into the raceway grooves is combined with the method of placing grease on one end surface of a circular ring forming a retainer, even when the quantity of grease to be applied into the raceway grooves is reduced, the rolling bearing can be lubricated sufficiently by the grease.

On the other hand, in the case of a rolling bearing requiring low torque and low torque variation, oil lubrication is employed. As a method for applying lubrication oil into a rolling bearing, there are known a method of applying lubrication oil into the raceway grooves of the inner and outer rings of the rolling bearing, and a method in which inner and outer rings are immersed in liquid composed of lubricating oil and solvent dissolved in the lubricating oil and, after then, the solvent is evaporated.

However, referring to the grease lubrication of a rolling bearing, in the method of placing grease on one end surface of a circular ring forming a retainer, since the grease is dropped down during the rotation of the rolling bearing, there is a fear that torque, Non-Repeatative-Runout Oscillation (hereinafter abbreviated to "NRRO"), and the rotation frequency (vibration fc) of the retainer can vary irregularly. Therefore, even in case where this method is combined with the method of loading grease into the raceway grooves, as a method for grease-lubricating a rolling bearing that is used especially in a magnetic disk apparatus (HDD) and an optical disk apparatus and is rotated at a high speed, there is still room for improvement.

Also, in the above-mentioned lubricating oil loading method, especially, since the lubricating oil having a low viscosity is hard to be held in the rolling bearing, in order to obtain good lubricating property for a long period of time, it is necessary to continue to supply the lubricating oil from outside. In case where lubricating oil having a high viscosity is used, the lubricating oil can be held for a longer period of time within the rolling bearing. However, in this case, there arises another problem that torque increases.

SUMMARY OF THE INVENTION

The present invention aims at eliminating the drawbacks found in the above-mentioned conventional grease lubricating methods. Accordingly, it is an object of the invention to be able to lubricate properly a rolling bearing for use in a magnetic disk apparatus (HDD) and an optical disk apparatus to be rotated at a high speed according to a method of placing grease on one end surface of a circular ring forming a retainer. Also, it is another object of the invention to be able to obtain good lubrication property for a long period of time even in case where lubricating oil is not supplied from outside.

The above object can be achieved by a retainer for use in a rolling bearing, according to the present invention, the retainer comprising a circular ring having an end surface on which a plurality of pockets are formed at predetermined intervals along a circumferential direction of the circular ring. Each of the pockets is formed by a projecting portion projected from the end surface, and a recessed portion recessed from the end surface. Each of the pockets includes a pocket surface including an inner surface of the projecting portion and a concave surface of the recessed portion. The end surface has a grease placement portion that is disposed between mutually adjoining ones of the pockets. The circular ring comprises a first groove for connecting together the grease placement portion and the pocket surface.

In the above-mentioned retainer, the circular ring may further comprise:
  a wall portion projecting from the end surface, the wall portion extending along the circumferential direction and disposed between the mutually adjoining ones of the pockets.

In the above-mentioned retainer, the circular ring may further comprise:
  a lubricant storing cavity disposed between the mutually adjoining ones of the pockets; and
  a second groove for connecting the lubricant storing cavity and the pocket surface.

In the above-mentioned retainer, it is advantageous that the first groove and the groove extend along the circumferential direction and are aligned with each other.

In the above-mentioned retainer, it is advantageous that the circular ring further comprises:
  first and second lubricant storing cavities disposed between the mutually adjoining ones of the pockets;
  a second groove for connecting the first lubricant storing cavity and the pocket surface of one of the mutually adjoining one; and
  a third groove for connecting the second lubricant storing cavity and the pocket surface of the other one of the mutually adjoining ones.

In the above-mentioned retainer, it is advantageous that the width of the first groove is set such that, in the circumferential direction of the circular ring, it becomes narrower as it approaches the pocket surface and it becomes narrower as the depth of the groove from the grease placement surface increases.

The above-mentioned object can also be attained by a rolling bearing, according to the other aspect of the present invention, comprising a retainer according to the above-mentioned aspect of the present invention.

According to the present retainer, in case where the present retainer is incorporated into a rolling bearing and is then rotated, the grease placed on the placement surface moves toward the pocket surface through the groove for connecting together the placement surface and pocket surface directly, and the base oil of the grease is supplied from the pocket through the rolling body to raceway grooves formed in the inner and outer rings of the rolling bearing.

Also, due to the existence of the wall portion, during rotation, drop-down of the grease from the placement surface due to its own centrifugal force can be prevented.

Also, according to the invention, there is provided a retainer for use in a rolling bearing structured such that, on one end surface of a circular ring disposed concentrically with a shaft, there are formed a plurality of pockets at given intervals along the circumferential direction of the circular ring, each of the pockets is formed of a projecting portion formed so as to project from the above end surface and a recessed portion formed so as to be recessed from the end surface, each pocket includes a pocket surface composed of the inner surface of the projecting portion and the concave surface of the recessed portion, and the retainer is used with grease placed between the mutually adjoining ones of the pockets on the end surface, wherein, in the circular ring, there is formed, between the mutually adjoining ones of the pockets on said end surface, a cavity into which lubricant (or lubricating oil) can be loaded, and, there is also formed a groove for connecting together the cavity and the pocket surface directly.

In the case of the present retainer, it is incorporated into a rolling bearing with lubricant loaded into the cavity; and, the lubricant within the cavity moves toward the pocket surface through the groove for connecting together the cavity and the pocket surface directly, and lubricating oil (in the case of grease, the base oil of the grease) is supplied from the pocket through the rolling body to the raceway grooves formed in the inner and outer rings of the rolling bearing. Thanks to this, even in case where lubricating oil is not supplied from outside, there can be obtained a good lubricating property for a long period of time.

In the retainer according to the invention, preferably, the width of the groove may be set such that, in the circumferential direction of the circular ring, it becomes narrower as it approaches the pocket surface and it becomes narrower as the depth of the groove from the placement surface increases.

Further, according to the other aspect of the invention, there is provided a rolling bearing including a retainer according to the above-mentioned aspect of the invention.

BRIEF DESCRIPTION OF THE DRAWINGS

FIG. 1 shows a first embodiment of a retainer for use in a rolling bearing according to the invention, specifically.

FIG. 2 shows a first embodiment of a retainer for use in a rolling bearing according to the invention, specifically.

FIG. 3 shows a first embodiment of a retainer for use in a rolling bearing according to the invention, specifically.

FIG. 6 shows a second embodiment of a retainer for use in a rolling bearing according to the invention, specifically.

DETAILED DESCRIPTION OF THE PREFERRED EMBODIMENTS

Now, description will be given below of the preferred embodiments of a retainer for use in a rolling bearing according to the invention.

Figure 1:
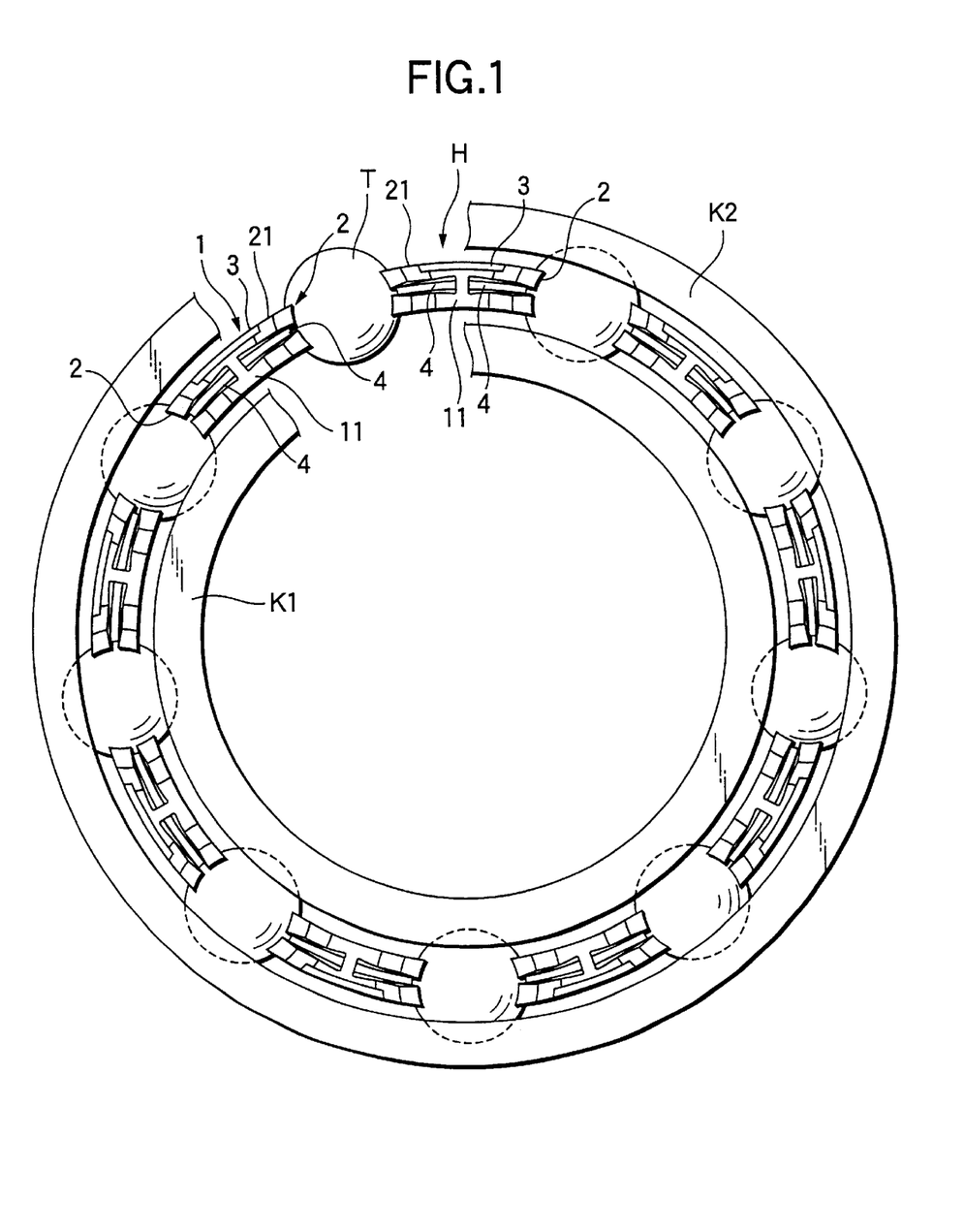
FIG. 1 is a plan view of the rolling bearing in which the present retainer is incorporated.
Figure 2:
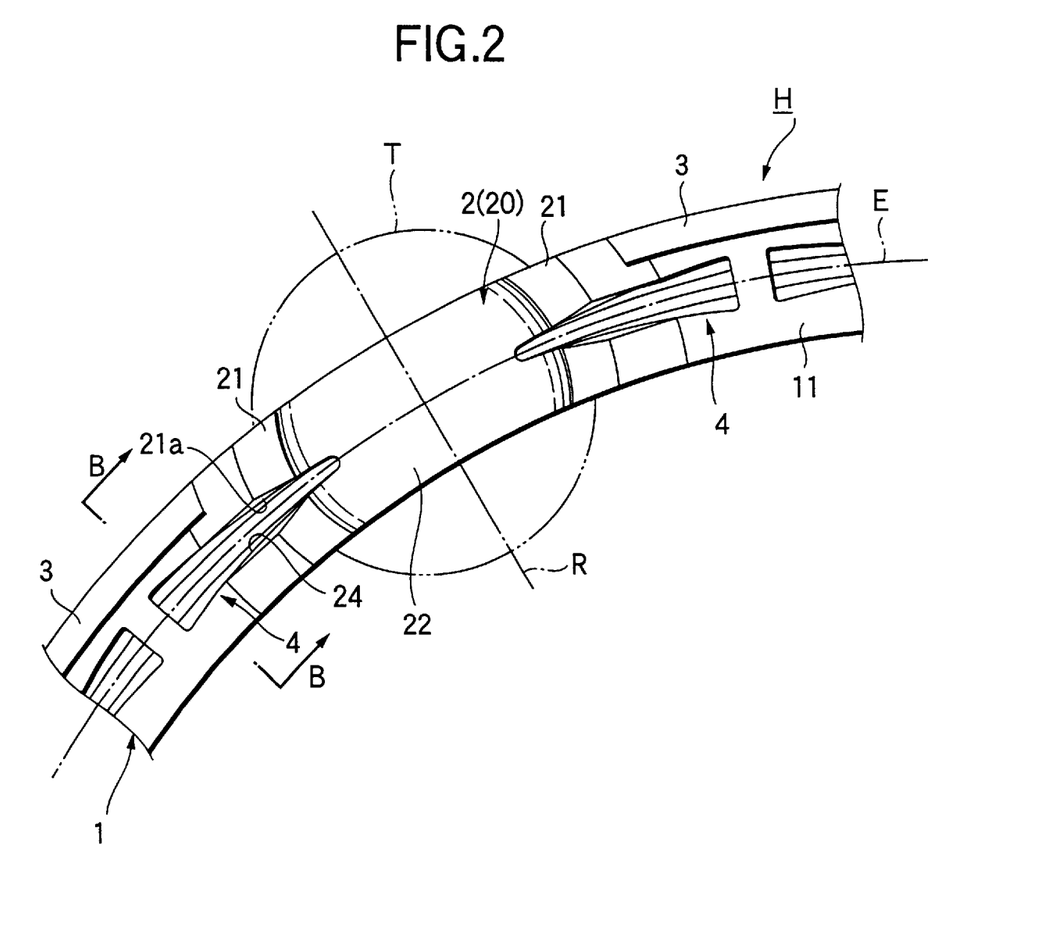
FIG. 2 is a partially enlarged plan view of the present retainer.
Figure 3:
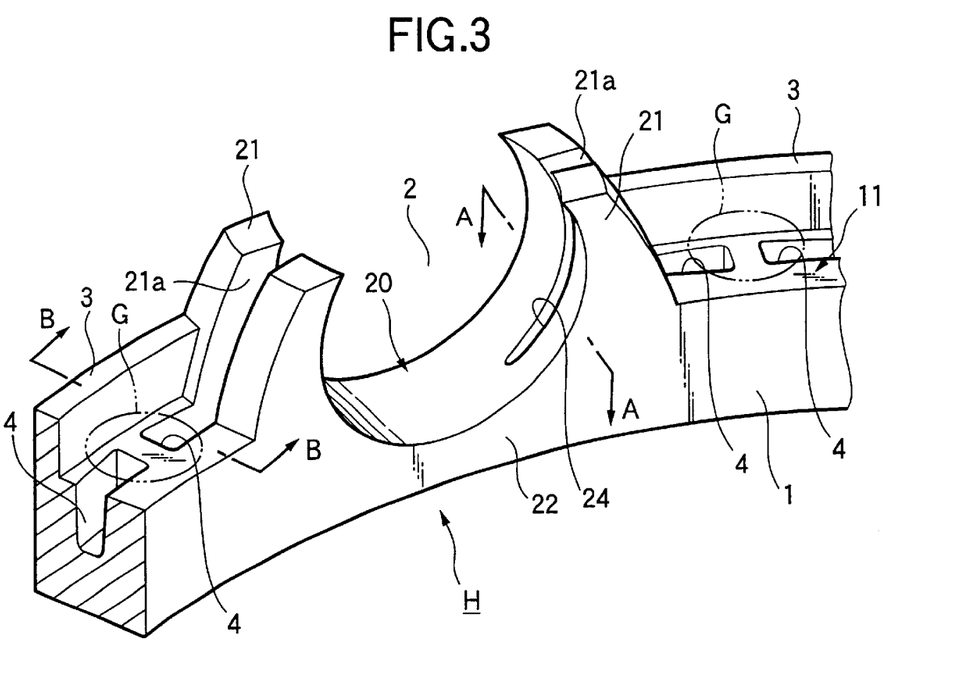
FIG. 3 is a partially enlarged perspective view of the present retainer.
Figure 4:
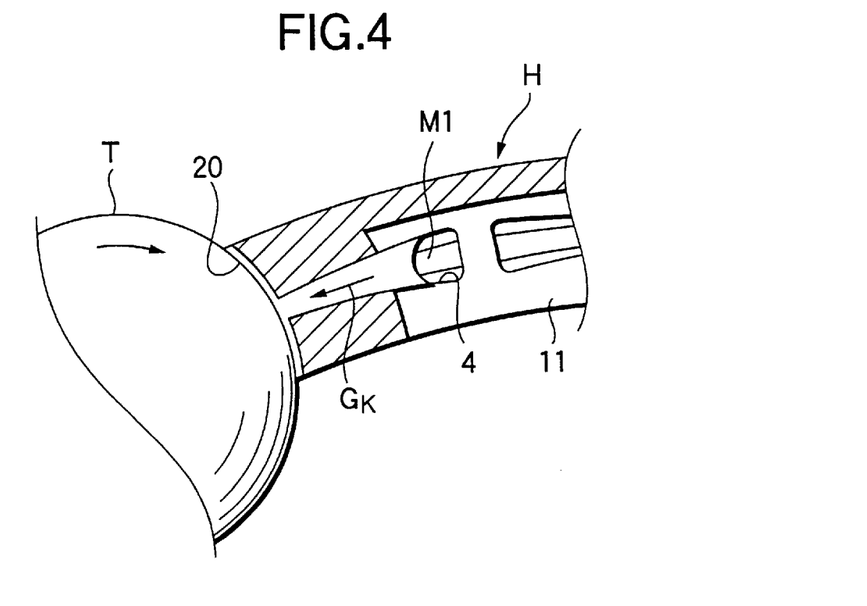
FIG. 4 is a section view taken along the arrow lines A—A shown in FIG. 3.
Figure 5:
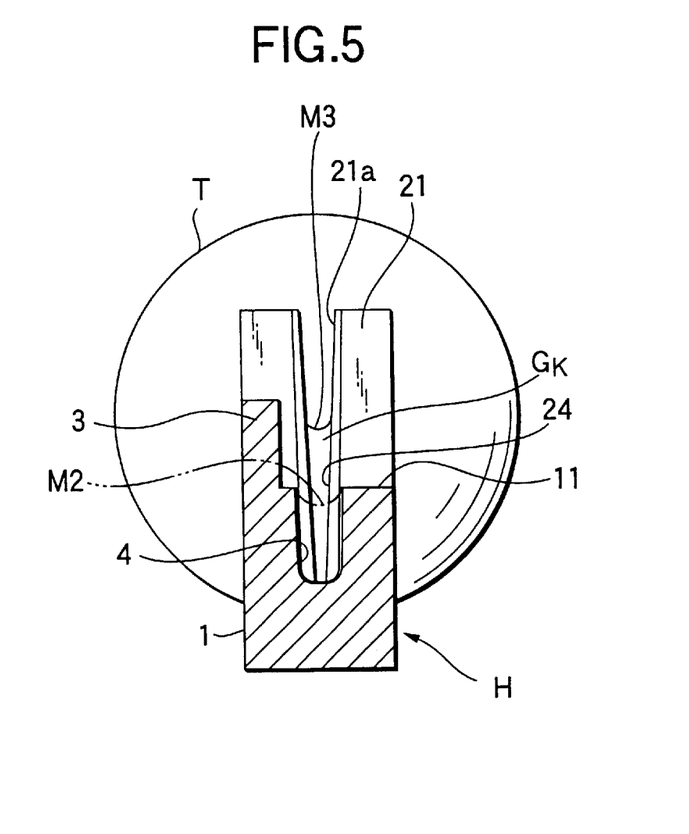
FIG. 5 is a section view taken along the arrow lines B—B shown in FIG. 3.

FIGS. 1–5 shows a first embodiment of a retainer for use in a rolling bearing according to the invention. FIG. 1 is a plan view of a rolling bearing incorporating the present retainer therein, in which the inner and outer rings of the rolling bearing are broken in part. FIG. 2 is a partially enlarged plan view of the present retainer. FIG. 3 is a partially enlarged perspective view of the present retainer. FIG. 4 is a section view (a section view perpendicular to the axial direction of the retainer) taken along the arrow lines A—A shown in FIG. 3. FIG. 5 is a section view (a section view along the axial direction of the retainer) taken along the arrow lines B—B shown in FIG. 3.

The present retainer H includes a circular ring 1 which is disposed concentrically with the axis of the retainer H; and, in one surface (one end surface in the axial direction) 11 of the circular ring 1, there are formed a plurality of pockets 2 at given intervals along the circumferential direction of the circular ring 1. Each pocket 2, as shown in FIGS. 2 and 3, is composed of a pair of pawl portions (projecting portions) 21 that project from the end surface 11 and are opposed to each other, and a recessed portion 22 which is recessed from the end surface 11. The recessed portion 22 is interposed between the pair of pawl portions 21; and, the concave surface of the recessed portion 22 cooperates together with the inner sursurfaces of the pawl portions 21, which are formed to be continuous with the concave surface, in forming a spherical-shaped pocket surface 20.

In the pawl portion 21 forming the pocket 2, specifically, in the central portion in the width direction thereof (in the radial direction R of the circular ring 1), there is formed a cut portion 21a. This cut portion 21a reaches the interior of the recessed portion 22, while the portion 24 of the cut portion 21a existing within the interior of the recessed portion 22 forms part of a groove 4 which will be discussed later.

The end surface 11 of the circular ring 1 exists only between the mutually adjoining pockets 2, while a wall portion 3 projecting from the end surface 11 is formed along the outer periphery of the circular ring 1 with a given thickness. This wall portion 3 closes a space between the mutually adjoining pawl portions 21 between the pockets 2. The thickness of the wall portion 3 is set, for example, about ¼ of the width (the dimension of the circular ring 1 in the radial direction R) of the end surface 11, while about ¾ of the end surface 11 are left as a surface for placing grease thereon.

The retainer H includes a plurality of grooves 4 each of which connects together the end surface 11 and pocket surface 20 directly. Each of the grooves 4 includes openings respectively in the end surface 11 and pocket 20. The grooves 4 respectively extend outside the pockets 2 along the circumferential direction E of the circular ring 1 with a given length, while the grooves 4 are respectively formed in their associated pockets 2 independently of one another. The cut portion 21a of the pawl portion 21 is formed to be continuous with the upper portion of the groove 4 that is present on the pocket 2 side.

The width of the groove is formed such that, in the circumferential direction E of the circular ring 1, it continuously narrows from the far side of the pocket surface 20 toward the near side thereof and, in the depth direction (in the axial direction of the circular ring 1) from the end surface (placement surface), it narrows continuously as the depth increases. The depth of the groove 4 is constant in the circumferential direction E and width direction (radial direction) of the circular ring 1. In the case of the portion, which is formed to be continuous with the cut portion 21a of the groove 4, the width thereof continuously narrows from the upper end of the cut portion 21a to the bottom of the groove 4.

The retainer H is used in such a manner that grease G is placed on the end surface (placement surface) 11 so as to be applied over the mutually adjoining grooves 4. As shown in FIG. 1, using the retainer H, an inner ring K1, and balls (rolling bodies) T, there is assembled a ball bearing (rolling bearing). In case where the thus-assembled bearing is rotated, the grease G placed on the retainer H, due to the existence of the wall portions 3, is prevented from falling down due to its centrifugal force and is thus prevented from being supplied to the raceway surfaces, so that the base oil of the grease G remains within the groove 4. The base oil remaining within the groove 4 flows little by little from the grooves 4 toward the pocket surfaces 20, is gradually supplied to the balls T within the pockets 2, and is supplied through the balls T to the raceway grooves of the inner and outer rings.

In the circumferential direction E of the circular ring 1, as shown in FIG. 4, within the groove 4, there is formed a meniscus M by the base oil Gk of the grease; and, due to the surface tension thereof, the base oil Gk is moved little by little toward the pocket 20 for a long period of time and is then supplied to the balls T.

In the axial direction of the circular ring 1 as well, as shown in FIG. 5, within the groove 4, there is formed a meniscus M2 by the base oil of the grease; and, due to the surface tension thereof, the base oil is moved little by little to the bottom side of the groove 4 for a long period of time and, finally, the base oil flows toward the pocket surface 20. Also, the base oil Gk of the grease collects in the cut portion 21a of the pawl portion 21 as well; and, due to the base oil Gk, there is formed a meniscus M3 and the base oil Gk is gradually supplied directly or through the groove 4 to the balls T within the pocket 2.

Therefore, according to the present retainer H, due to the grease lubrication, there can be prevented occurrence of irregular variations in the torque, NRRO, and fc of the rolling bearing. Also, the lubricating oil moves little by little from the grooves 4 to the pocket surfaces 20 for a long period of time and is then supplied to the raceway grooves of the inner and outer rings through the balls T. Thanks to this, even in the case of a rolling bearing which is used in a magnetic disk apparatus (HDD) and an optical disk apparatus and is rotated at a high speed, the grease lubrication of the rolling bearing can be done properly according to a method in which grease is placed on one end surface of a circular ring forming a retainer.

However, the above-mentioned operation and effects to be obtained by the present retainer H can be obtained when grease having an excellent oil separating property is used or when grease is used in a condition where the oil of the grease is easy to separate from the grease, for example, in a high using temperature.

By the way, the width of the groove 4 and its variation rate as well as the cut width of the cut portion 21a and its variation rate may be set properly in consideration of the viscosity of the base oil of grease and the supply quantity of grease. Further, alternatively, the depth of the groove 4 may not be set constant in the circumferential direction E and radial direction R (with direction) of the circular ring 1 but may be varied such that the base oil of the grease is easy to move toward the pocket surface.

Also, in the present embodiment, due to provision of the cut portion 21a in the pawl portion 21, a larger quantity of lubricating oil can be supplied to the pocket surface 20 than the structure in which the cut portion 21a is not formed. Further, in case where the cut portion 21a is formed, when a retainer is produced according to a molding method using a metal mold, it is easy to remove the resultant molding from the metal mold in the axial direction thereof.

Figure 6:
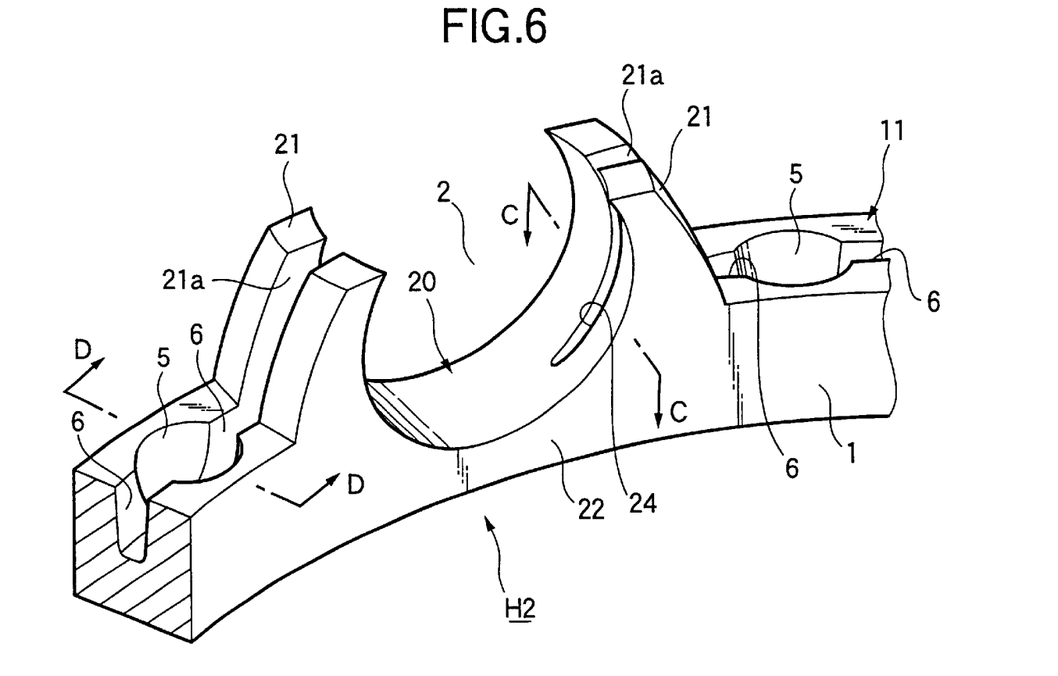
FIG. 6 is a partially enlarged perspective view of the present retainer.
Figure 7:
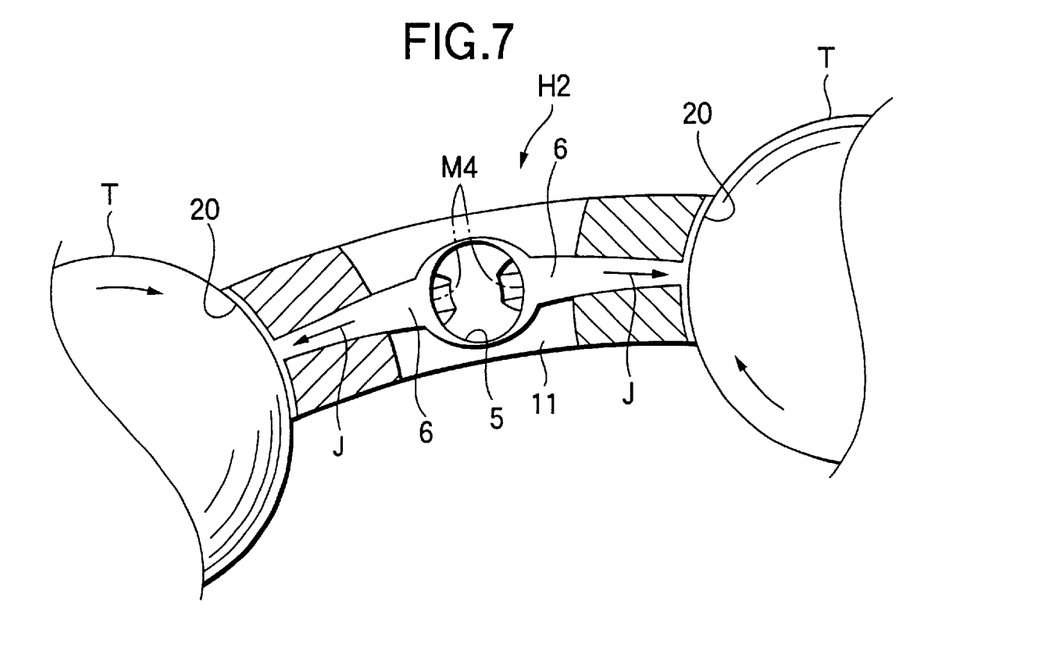
FIG. 7 is a section view taken along the arrow lines C—C shown in FIG. 6.
Figure 8:
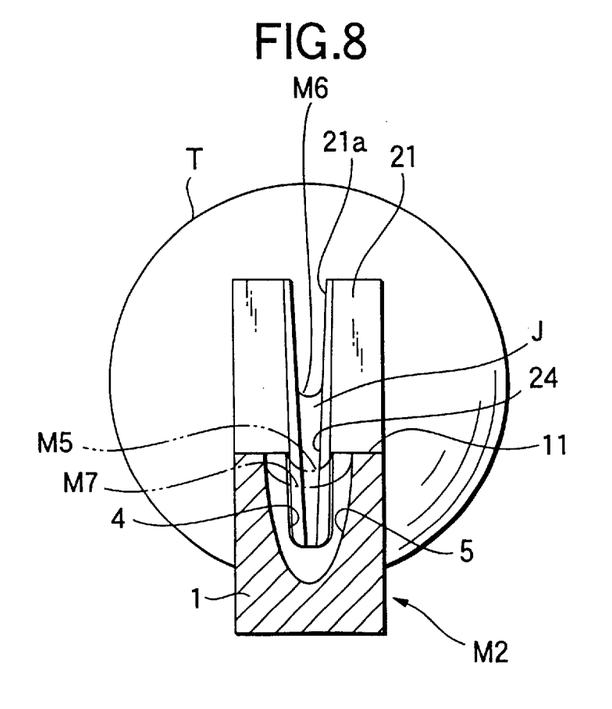
FIG. 8 is a section view taken along the arrow lines D—D shown in FIG. 6.

Now, FIGS. 6 to 8 respectively show a second embodiment of a retainer for use in a rolling bearing according to the invention. Specifically, FIG. 6 is a partially enlarged perspective view of the present retainer. FIG. 7 is a section view taken along the arrow line C—C shown in FIG. 6 (a section view perpendicular to the axial direction of the retainer). FIG. 8 is a section view taken along the arrow line D—D shown in FIG. 6 (a section view along the axial direction of the retainer).

In the present retainer H2, between mutually adjoining pockets 2 formed in the end surfaces 11 of the circular ring 1, there are formed cavities 5 into which lubricant can be loaded; and, the cavities 5 and pocket surfaces 20 are connected together by their associated grooves 6. The portion of each cavity 5 that exists in the end surface 11 is formed substantially in an elliptical shape, while the two ends of the cavity 5 in the major axis direction thereof are formed so as to be continuous with the two mutually adjoining grooves 6.

The shape of the groove 6 is the same as that of the groove 4 of the retainer H according to the first embodiment. The width (the dimension of the circular ring 1 in the radial direction thereof) of the cavity 5 is greater than the width of the groove 6 and the depth of the cavity 5 is greater than that of the groove 6. The shape of the section of the cavity 5 along the axial direction thereof is formed such that, as shown in FIG. 8, on both of the inner and outer peripheral sides of the circular ring 1, it becomes narrower as the depth thereof from the end surface 11 increases.

The retainer H2 is used with lubricating oil J loaded in the cavities 5. Similarly to the first embodiment, using the retainer H2, an inner ring K1, an outer ring K2 and balls (rolling bodies) T, there is assembled a ball bearing (rolling bearing). In case where the thus-assembled ball bearing is rotated, the lubricating oil within the cavities 5 moves gradually from the grooves 6 toward the pocket surfaces 20, is then supplied little by little to the balls T within the pockets 2, and is finally supplied through the balls T to raceway grooves formed in the inner and outer rings.

In the circumferential direction of the circular ring 1, as shown in FIG. 7, on the respective grooves 6 sides of each cavity 5, there are formed meniscuses M4 due to the lubricating oil J. This lubricating oil J, due to the surface tension thereof, is allowed to move little by little from the grooves 6 to the pocket surfaces 20 for a long period of time, and is then supplied to the balls T.

In the axial direction of the circular ring 1 as well, as shown in FIG. 8, due to the lubricating oil J, there is formed a meniscus MS within each groove 6. This lubricating oil J, due to the surface tension thereof, is allowed to move little by little toward the bottom side of each groove 6 for long period of time, and is finally moved toward the pocket 20. Also, the lubricating oil J collects in the cut portion 21a of the pawl portion 21 as well, due to the lubricating oil J, there is formed a meniscus 6, and this lubricating oil J is also supplied little by little to the balls T within the pocket 2 directly or through the groove 6. Further, within the cavity 5 as well, there is formed a meniscus M7 due to the lubricating oil J.

As described above, according to the present retainer H2, the lubricating oil within the cavity 5 moves gradually from the grooves 6 to the pockets 20 for a long period of time, and is supplied through the balls T to the raceway grooves formed in the inner and outer rings. Therefore, even in case where lubricating oil is not supplied from outside, there can be obtained a good lubricating property for a long period of time. Also, since the necessary and minimum quantity of lubricating oil is supplied into the interior of the bearing, torque and variations in the torque can be controlled down to a minimum.

Figure 9:
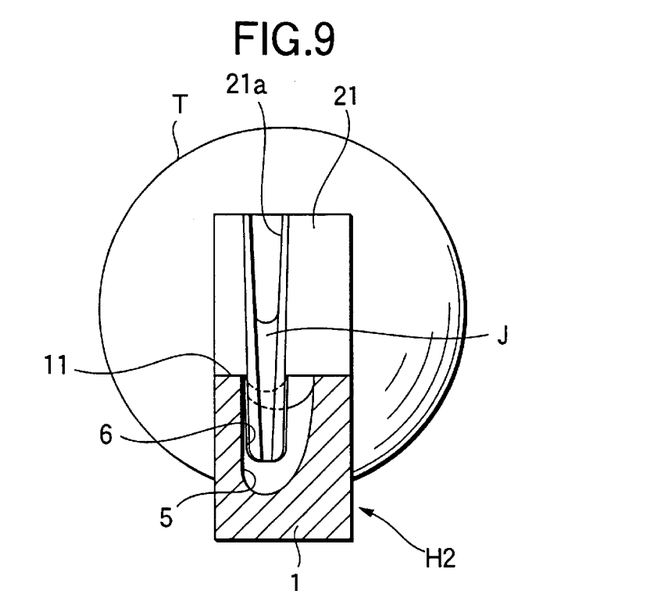
FIG. 9 is a view of another embodiment of the shape of the section of a cavity; and, FIG. 10 is a view of another embodiment of the arrangement of a cavity.

By the way, in case where the section shape of each cavity 5 along the axial direction thereof is formed such that, as shown in FIG. 9, on the inner peripheral side of the circular ring 1, it becomes narrower as the depth thereof from the end surface 11 increases and, on the outer peripheral side of the circular ring 1, it is not inclined in the depth direction, when the bearing is in rotation, the lubricating oil within the cavities 5 can be prevented from scattering due to the centrifugal force thereof as well as a sufficient quantity of lubricating oil can be supplied into the cavities 5. Also, in case where the section shape of each cavity 5 along the axial direction thereof is formed such that, on the outer peripheral side of the circular ring 1, it becomes wider toward the outer peripheral side as the depth thereof from the end surface 11 increases, when the bearing is in rotation, the lubricating oil within the cavities 5 can be more effectively prevented from scattering due to the centrifugal force thereof.

Figure 10:
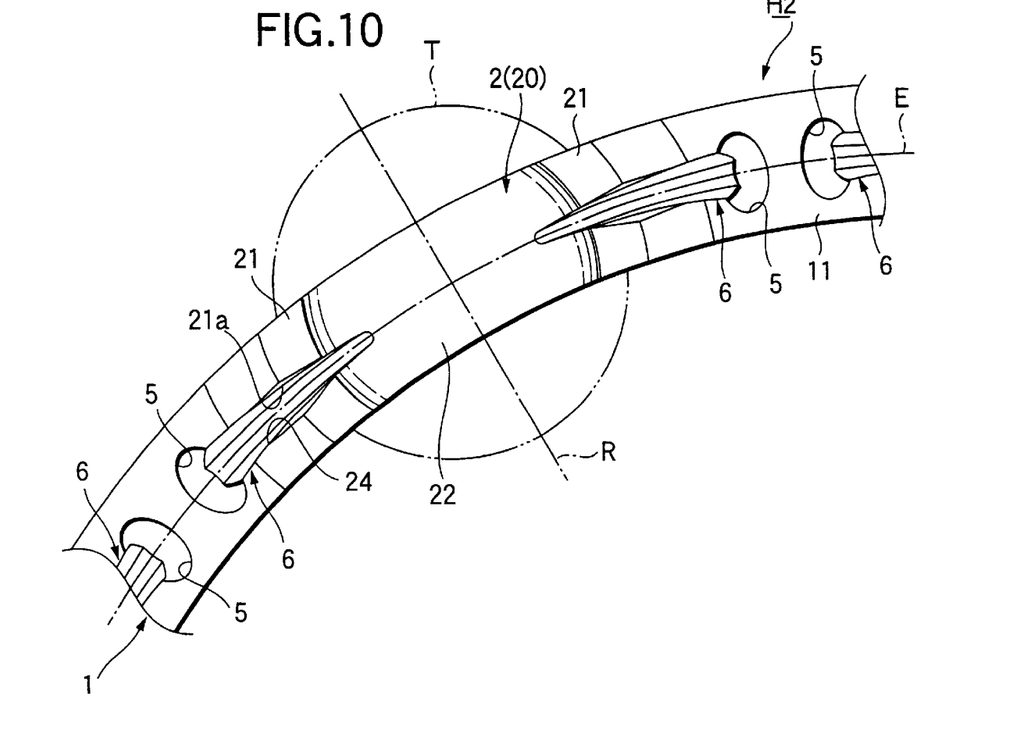

Also, in the present embodiment, there is employed a structure in which the lubricating oil is supplied from one cavity 5 to two mutually adjoining grooves 6. However, there may also be employed a structure in which, as shown in FIG. 10, one cavity 5 is formed for every groove 6.

Further, in the above embodiments, description has been given of a retainer for use in a ball bearing. However, a retainer for use in a rolling bearing including other types of rolling bodies than balls can also fall within the scope of the invention.

As has been described heretofore, according to the invention, the grease lubrication of a rolling bearing, which is used in a magnetic disk apparatus (HDD) and an optical disk apparatus and is to be rotated at a high speed, can be carried out properly according to a method in which grease is placed on one end surface of a retainer.

Also, in the oil lubrication of the rolling bearing, even in case where lubricating oil is not supplied from outside, there can be obtained a good lubricating property for a long period of time.

What is claimed is:

1. A retainer for use in a rolling bearing, comprising:
a circular ring having an end surface on which a plurality of pockets are formed at predetermined intervals along a circumferential direction of said circular ring,
wherein each of said pockets is formed by a projecting portion projected from said end surface and a recessed portion recessed from said end surface, and each pocket includes a pocket surface including an inner surface of said projecting portion and a concave surface of said recessed portion,
wherein said end face has a grease placement portion that is disposed between mutually adjoining ones of said pockets, and
wherein said circular ring comprises a first groove for connecting together said grease placement portion and said pocket surface.

2. The retainer according to claim 1, wherein said circular ring further comprises:
a wall portion projecting from said end surface, said wall portion extending along the circumferential direction and disposed between said mutually adjoining ones of said pockets.

3. The retainer according to claim 2, wherein said circular ring further comprises:
first and second lubricant storing cavities disposed between said mutually adjoining ones of said pockets;
a second groove for connecting said first lubricant storing cavity and said pocket surface of one of said mutually adjoining one; and
a third groove for connecting said second lubricant storing cavity and said pocket surface of the other one of said mutually adjoining ones.

4. The retainer according to claim 2, wherein said circular ring further comprises:
a lubricant storing cavity disposed between said mutually adjoining ones of said pockets; and
a second groove for connecting said lubricant storing cavity and said pocket surface.

5. The retainer according to claim 4, wherein said first groove and said groove extend along said circumferential direction and are aligned with each other.

6. The retainer according to claim 2, wherein the width of said first groove is set such that, in the circumferential direction of said circular ring, it becomes narrower as it approaches said pocket surface and it becomes narrower as the depth of said groove from said grease placement surface increases.

7. The retainer according to claim 1, wherein said circular ring further comprises:
first and second lubricant storing cavities disposed between said mutually adjoining ones of said pockets;
a second groove for connecting said first lubricant storing cavity and said pocket surface of one of said mutually adjoining one; and
a third groove for connecting said second lubricant storing cavity and said pocket surface of the other one of said mutually adjoining ones.

8. The retainer according to claim 1, wherein the width of said first groove is set such that, in the circumferential direction of said circular ring, it becomes narrower as it approaches said pocket surface and it becomes narrower as the depth of said groove from said grease placement surface increases.

9. The retainer according to claim 1, wherein said circular ring further comprises:
a lubricant storing cavity disposed between said mutually adjoining ones of said pockets; and
a second groove for connecting said lubricant storing cavity and said pocket surface.

10. The retainer according to claim 9, wherein said first groove and said groove extend along said circumferential direction and are aligned with each other.

11. The retainer according to claim 9, wherein the width of said first groove is set such that, in the circumferential direction of said circular ring, it becomes narrower as it approaches said pocket surface and it becomes narrower as the depth of said groove from said grease placement surface increases.

12. A rolling bearing comprising:
a retainer according to any one of claims 1 to 11.

* * * * *